(12) United States Patent
Chen et al.

(10) Patent No.: US 6,392,882 B1
(45) Date of Patent: May 21, 2002

(54) HOLDER

(75) Inventors: Ching-Shih Chen, Taipei; Sheng-Ming Liu, Junghe; Hsin-Chien Peng, Jungli, all of (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 09/714,953

(22) Filed: Nov. 20, 2000

(30) Foreign Application Priority Data

Apr. 19, 2000 (TW) ......................................... 089206410

(51) Int. Cl.$^7$ ................................................. H05K 5/00
(52) U.S. Cl. ....................... 361/686; 361/754; 361/741; D14/114
(58) Field of Search .............................. 361/686, 687, 361/680–683, 725–727, 741, 754, 756; D6/396, 397; D14/100, 114

(56) References Cited

U.S. PATENT DOCUMENTS

| | | | | |
|---|---|---|---|---|
| 4,969,830 A | * | 11/1990 | Daly et al. ................... 439/136 |
| 5,835,732 A | * | 11/1998 | Kikinis et al. ............... 395/281 |
| 5,970,974 A | * | 10/1999 | Van Der Linden et al. . 128/200 |
| 6,266,017 B1 | * | 7/2001 | Aldous ........................ 343/702 |
| 6,275,933 B1 | * | 8/2001 | Fine et al. ...................... 713/2 |

* cited by examiner

*Primary Examiner*—Leo P. Picard
*Assistant Examiner*—Hung Van Duong
(74) *Attorney, Agent, or Firm*—Rabin & Berdo

(57) ABSTRACT

A holder for protecting a palmtop comprising of an activation button. When the activation button is depressed, it shuts down the palmtop which is removed from the holder by pushing it forward along the holder. The activation button comprises of an embossment, a boss, contact point, and trigger. The embossment connects with the palmtop tightly before the activation button is depressed while the boss is convenient for users to press the activation button. Moreover, the contact point will touch the trigger to shut down the palmtop after the active button is depressed.

9 Claims, 3 Drawing Sheets

HOLDER

This application incorporates by reference Taiwanese application Serial No. 89206410, Filed Apr. 1, 2000.

BACKGROUND OF THE INVENTION

1. Field of the Invention

The invention relates in general to a holder, and more particularly to a holder for protecting a palmtop.

2. Description of the Related Art

Nowadays, the development of personal computers tends towards the minimization of both design and components. Increasing intelligence is also of high demand. Therefore the development of palmtops, such as personal digital assistants (PDAs), is becoming an important aspect in the progress of informational technology.

The main differences between a PDA and an ordinary personal computer are that the PDA has a special interface (e.g. the handwriting input), handwriting recognition technology, the ability of wireless communication (e.g. sound and data transmission), and portability. Therefore, the PDA can satisfy individual computing needs without the limitation of time and location.

However, because of its portability, protection of the PDA is an important issue. Conventionally, a holder U is used to both provide protection and expanded functionality for the PDA. Although this provides adequate protection, it has the disadvantage of being fixed to the PDA, making its removal difficult.

SUMMARY OF THE INVENTION

It is therefore an object of the invention to provide an improved holder for protecting a palmtop, for example, a PDA. The protected device in the holder can be easily removed and, when removed, automatically powered down.

The invention achieves the above-identified objects by providing a new holder for protecting a palmtop, which includes an activation button. The palmtop will be shut down the moment the activation button is depressed down and the palmtop can then be removed from the holder by pushing the device forward. The activation button includes an embossment, a boss, a contact point, and a trigger. The embossment connects with the palmtop tightly before the activation button is depressed while the boss is a convenience for the user to depress the activation button. When the activation button is depressed, the contact point will touch the trigger and force the palmtop to shut down.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
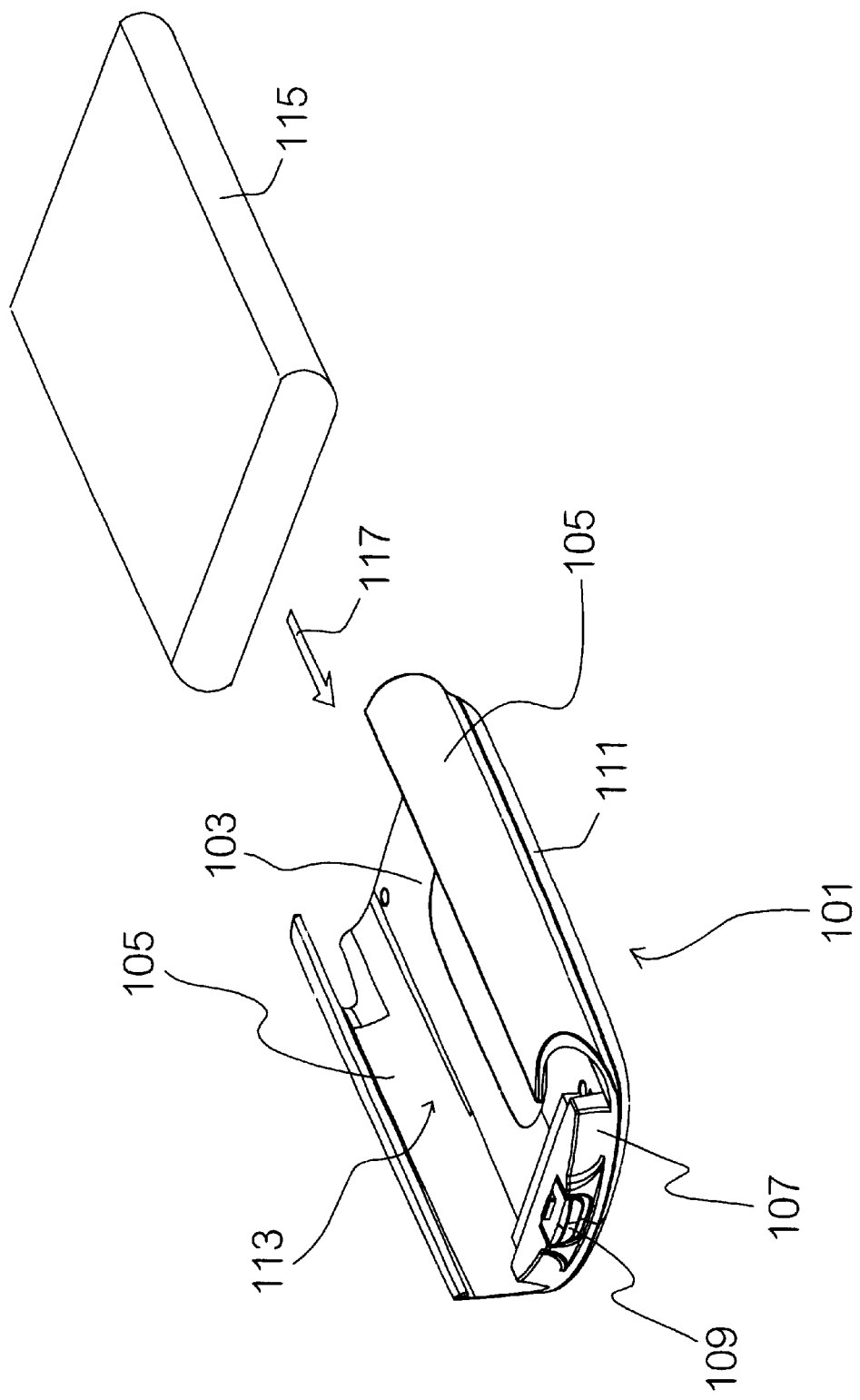
FIG. 1 illustrates a three dimensional diagram of a palmtop with an activation button according to a preferred embodiment of the invention.

As FIG. 1 is depicted, the holder 101 includes a bottom tray 103, guard borders 105, a bottom holder 107, an activation button 109, and inserting tray 111. The bottom tray 103 is of a quadrilateral design with a fixed thickness while the two guard borders 105 are respectively connected to two opposite sides of the bottom tray 103. In addition, the bottom holder 107 is connected to one end of the bottom tray 103 in between the two guard borders 105. The two guard borders 105 and the bottom holder 107, therefore, form a space 113 for containing a device 115. The device 115 can be a palmtop, such as a PDA, and an arrow symbol 117 indicates the direction in which the device 115 should be pushed to place it into the holder 101.

Figure 2:
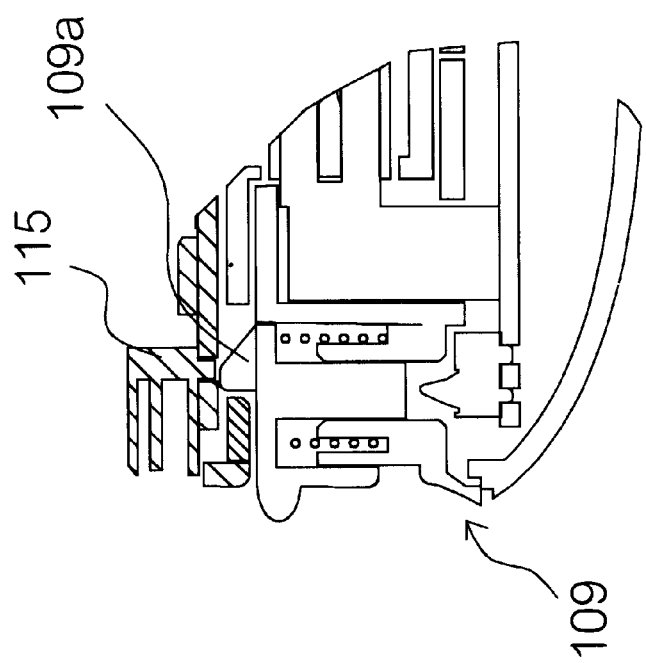
FIG. 2 shows a cross-sectional profile diagram of the connection between the activation button and the protected device according to a preferred embodiment of the invention.

The inserting tray 111 is connected to the bottom tray 103 so that there exists a space between the inserting tray 111 and the bottom tray 103 for inserting a CF or PCMCIA card. The features of the invention mainly lie on the functions of the activation button 109. As illustrated in FIG. 2, the activation button 109 includes an embossment 109a, a boss 109b, contact point 109c, and trigger 109d. The protected device 115 is embedded in the holder 101 according to the arrow symbol 117, and the embossment 109a of the activation button 109 is tightly embedded in the protected device 115 so that the protected device 115 will not slip off the holder 101. As a result, the holder 101 in the invention has the features of good appearance, convenience of removal, and good protection of contents.

Figure 3:
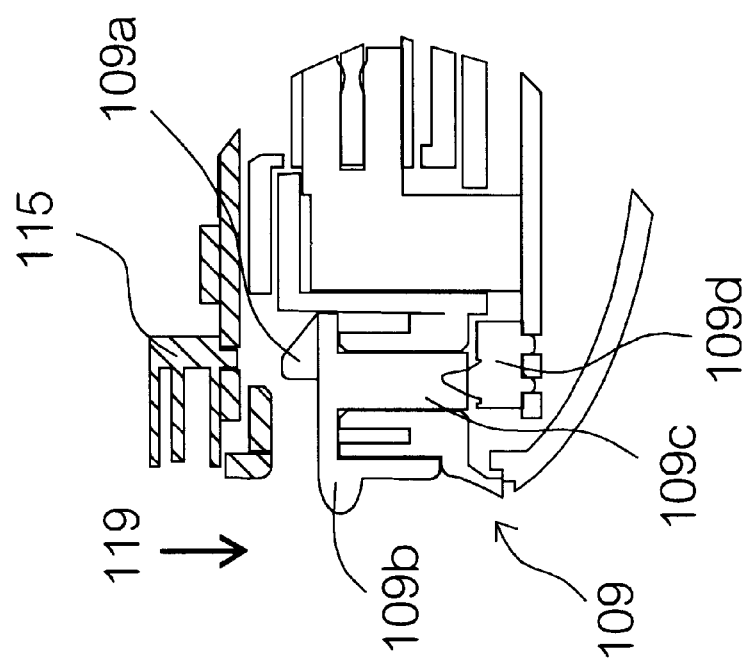
FIG. 3 shows a cross-sectional profile diagram of the department between the activation button and the protected device according to a preferred embodiment of the invention.

As depicted in FIG. 3, when the protected device 115 is to be drawn out of the holder 101, the boss 109b of the activation button 109 is pushed down according to the direction of the arrow symbol 119. In this way, the protected device 115 can be pushed away from the activation button 109 and drawn out of the holder 101 by sliding it forward along the holder 101. Moreover, another feature of the invention lies in that the contact point 109c at the bottom of the activation button 109, when the boss 109b is pushed down, will contact the trigger 109d and trigger the protected device 115 to shut down. Therefore, the holder 101 of the invention also functions to automatically shut down the device 115 when it is being removed from the holder 101.

Figure 4:
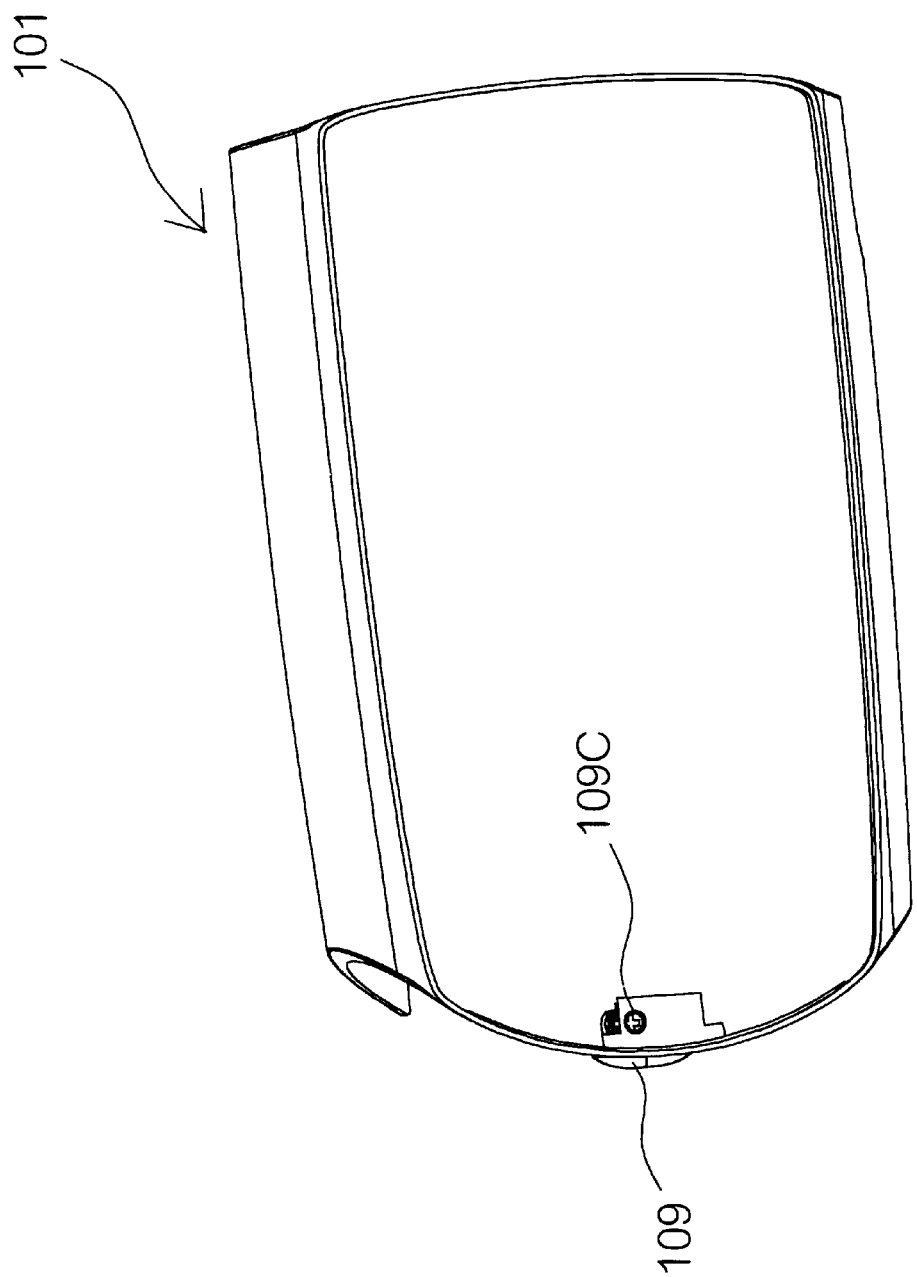
FIG. 4 shows a bottom view diagram of the holder according to a preferred embodiment of the invention.

As shown in FIG. 4, the contact point 109c of the activation button 109 is spring-loaded and can move up and down according to the movement of the activation button 109.

In conclusion, the advantages of the invention are as follows:

1. When the protected device is placed into the holder, the protected device can connect to the activation button tightly so that it cannot slip out of the holder.
2. The holder has the features of good appearance, convenience of removal, and good protection of contents.
3. When the protected device is to be drawn out of the holder, it is powered down first as the activation button is pushed down before it is removed from the holder by sliding it along the holder.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A holder for protecting an electronic device, comprising:
   opposing guard borders, and a bottom holder, which collectively form a space for receiving the electronic device therein; and
   an activation button disposed in said bottom holder, said activation button being adapted to connect the electronic device to said holder when the electronic device is received within the space, said activation button being depressible to shut down the electronic device and to simultaneously release the electronic device to allow the electronic device to be removed from said holder by pushing the electronic device forward along said guard borders and in a direction away from said bottom holder.

2. A holder according to claim 1, wherein the activation button comprises an embossment that connects to the electronic device tightly when the electronic device is received within the space and before said activation button is depressed.

3. A holder according to claim 1, wherein said activation button further comprises a boss, said boss being pressible by a user to depress said activation button.

4. A holder according to claim 1, wherein said activation button further comprises a contact point and a trigger, said contact point touching said trigger when said activation button is depressed to shut down the electronic device.

5. A holder according to claim 1, wherein,the electronic device is a palmtop.

6. A holder according to claim 1, wherein the electronic device is a personal digital assistant (PDA).

7. A holder for protecting a palmtop, comprising:
   opposing guard borders, and a bottom holder, which collectively form a space for receiving the palmtop therein; and
   an activation button disposed in said bottom holder, said activation button being adapted to connect the palmtop to said holder when the palmtop is received within the space, said activation button being depressible to shut down the palmtop and to simultaneously release the palmtop to allow the palmtop to be removed from said holder by pushing the palmtop forward along said guard borders and in a direction away from said bottom holder, said activation button comprising:
      an embossment that becomes tightly embedded in the palmtop before said activation button is depressed and that moves away from the palmtop when said activation button is depressed; and
      a boss located at a front of said activation button, said boss being pressible by a user to depress said activation button.

8. A holder according to claim 7, wherein the palmtop is a PDA.

9. A holder according to claim 7, wherein said activation button further comprises:
   a contact point and a trigger, said contact point touching said trigger to shut down the palmtop.

* * * * *